US008833066B2

(12) United States Patent
Renner

(10) Patent No.: US 8,833,066 B2
(45) Date of Patent: Sep. 16, 2014

(54) LOW SPEED HYDRAULIC CONTROL FOR FINE CONTROL OF HYDRAULIC CRANES

(75) Inventor: Ross Renner, Black Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 985 days.

(21) Appl. No.: 12/940,807

(22) Filed: Nov. 5, 2010

(65) Prior Publication Data
US 2011/0173963 A1 Jul. 21, 2011

Related U.S. Application Data

(60) Provisional application No. 61/295,915, filed on Jan. 18, 2010.

(51) Int. Cl.
F16D 31/02 (2006.01)
E02F 9/22 (2006.01)
F02D 29/04 (2006.01)
B60P 3/14 (2006.01)
B66C 13/40 (2006.01)
F15B 11/05 (2006.01)
B66C 23/42 (2006.01)

(52) U.S. Cl.
CPC ............ F15B 11/055 (2013.01); E02F 9/2246 (2013.01); F15B 2211/6658 (2013.01); F02D 29/04 (2013.01); B60P 3/14 (2013.01); F15B 2211/6346 (2013.01); F15B 2211/6651 (2013.01); F15B 2211/20523 (2013.01); B66C 13/40 (2013.01); F15B 2211/634 (2013.01); F15B 2211/633 (2013.01); B66C 23/42 (2013.01); F15B 2211/6333 (2013.01)
USPC .............................................. 60/431; 60/462

(58) Field of Classification Search
USPC ...................... 60/431, 445, 449, 462
See application file for complete search history.

(56) References Cited

U.S. PATENT DOCUMENTS

| 4,164,120 | A | * | 8/1979 | Funk et al. | 60/431 |
| 6,546,724 | B2 | * | 4/2003 | Nishimura et al. | 60/431 |
| 8,464,526 | B2 | * | 6/2013 | Renner | 60/431 |
| 2006/0229786 | A1 | * | 10/2006 | Sawada | 701/50 |
| 2009/0193800 | A1 | | 8/2009 | Peters | |

FOREIGN PATENT DOCUMENTS

| EP | 0879968 A1 | 11/1998 |
| EP | 1178158 A1 | 2/2002 |
| GB | 2417793 | 3/2006 |
| WO | 2009099860 A1 | 8/2009 |

OTHER PUBLICATIONS

International Search Report for application No. PCT/US2011/031278 mailed May 6, 2011.

* cited by examiner

Primary Examiner — Michael Leslie
(74) Attorney, Agent, or Firm — Fletcher Yoder P.C.

(57) ABSTRACT

The present disclosure provides embodiments directed towards a method and a system for fine control of hydraulic cranes. In one embodiment, a system is provided. The system includes a service pack having an engine. The engine has an operating speed ranging from a low speed to a high speed, a hydraulic pump coupled to the engine, wherein the hydraulic pump is configured to supply a hydraulic output to a hydraulic load, and a control system configured to control the hydraulic output. The control system includes a fine control mode configured to lock the engine in the low speed and control the hydraulic output in proportion to a percentage of a trigger activation.

20 Claims, 8 Drawing Sheets

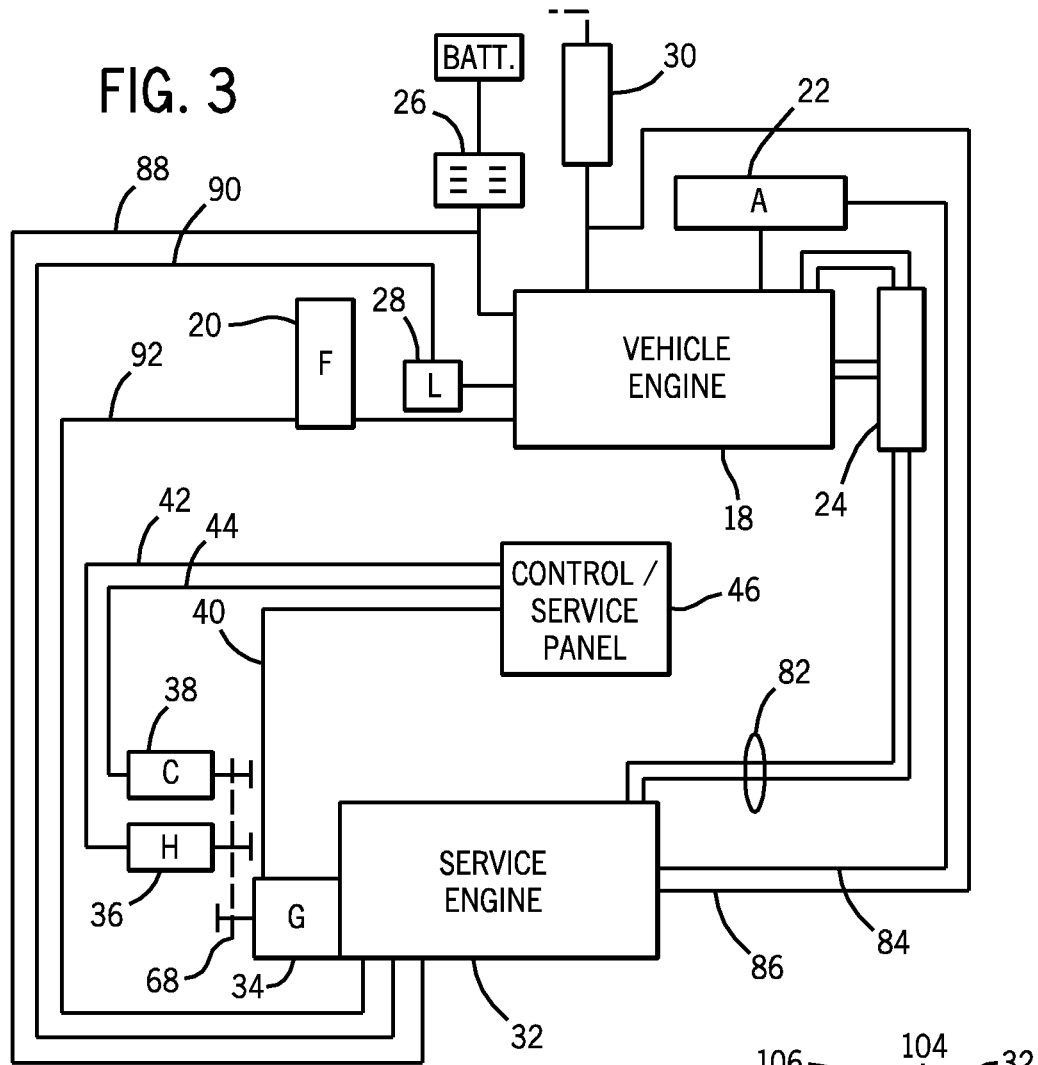
FIG. 3
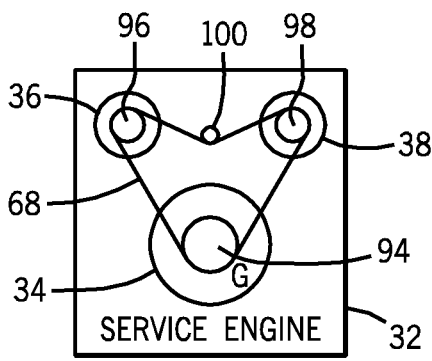
FIG. 4A
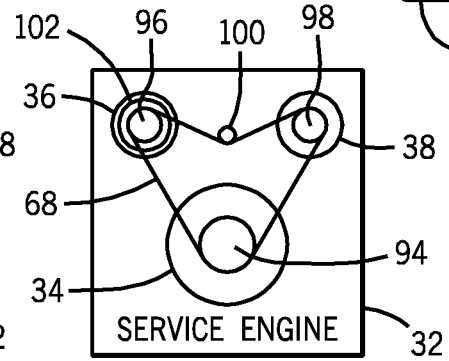
FIG. 4B
FIG. 4C

LOW SPEED HYDRAULIC CONTROL FOR FINE CONTROL OF HYDRAULIC CRANES

CROSS REFERENCE TO RELATED APPLICATIONS

This application claims the benefit of U.S. Provisional Patent Application Ser. No. 61/295,915, entitled "LOW SPEED HYDRAULIC CONTROL FOR FINE CONTROL OF HYDRAULIC CRANES", filed on Jan. 18, 2010, which is herein incorporated by reference in its entirety.

BACKGROUND

The present embodiments relate generally to power management for an engine and a hydraulic pump used for powering hydraulic loads. More specifically, the present disclosure relates to the control of engine speed and/or a hydraulic pump output in a service pack in response to the amount of hydraulic load that has been applied.

Some work vehicles may provide auxiliary resources, such as electrical power, compressor air service, and/or hydraulic service that are powered via one or more engines, such as the vehicle engine. Of course, these integrated auxiliary resources rely on operation of the one or more engines for power. Some engines, such as the main vehicle engine, can be large engines, which are particularly noisy, significantly over powered for the integrated auxiliary resources, and fuel inefficient. Further, other smaller engines can also be fuel inefficient at times. For example, a typical hydraulic system used to power a crane may be powered by an engine. Typically, the hydraulic system uses full hydraulic output and full engine speed, despite the amount of load applied by the user. In such arrangements, the user must carefully operate the hydraulic machinery to avoid over-adjusting the position of the crane. However, such operation may be difficult for the user. Moreover, the use of full engine and hydraulic output is often power-inefficient, which can reduce the life of the engine and hydraulic parts. Accordingly, there is a need for improved systems for supplying hydraulic output to hydraulic loads, such as a crane.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present embodiments address the above-mentioned and other shortcomings of hydraulic systems by providing embodiments directed towards a method and a system for fine control of hydraulic cranes. In one embodiment, a system is provided. The system includes a service pack having an engine. The engine has an operating speed ranging from a low speed to a high speed, a hydraulic pump coupled to the engine, wherein the hydraulic pump is configured to supply a hydraulic output to a hydraulic load, and a control system configured to control the hydraulic output. The control system includes a fine control mode configured to lock the engine in the low speed and control the hydraulic output in proportion to a percentage of a trigger activation.

In another embodiment, the present disclosure provides a method for controlling a hydraulic output. The method includes receiving a first request to operate a hydraulic system in a fine control mode. The hydraulic system includes an engine, a hydraulic pump driven by the engine, and a hydraulic load driven by a hydraulic output supplied by the hydraulic pump. The method also includes locking the engine in a low speed in the fine control mode, wherein the engine has an operating speed ranging from the low speed to a high speed. The hydraulic output is restricted to a range below a limit in the fine control mode, and the hydraulic output is controlled in proportion to a percentage of a trigger activation, wherein the hydraulic output includes a hydraulic flow rate or a hydraulic pressure.

DRAWINGS

These and other features, aspects, and advantages of the present invention will become better understood when the following detailed description is read with reference to the accompanying drawings in which like characters represent like parts throughout the drawings, wherein:

FIG. 3 is a diagram of an embodiment of power systems in the vehicle of FIG. 1, illustrating support systems of the service pack integrated with support systems of the vehicle engine;

FIGS. 4A-4C are diagrams of embodiments of the service pack with different arrangements of a generator, a hydraulic pump, and an air compressor driven by a service pack engine in accordance with certain embodiments of the present disclosure;

DETAILED DESCRIPTION

Figure 1:
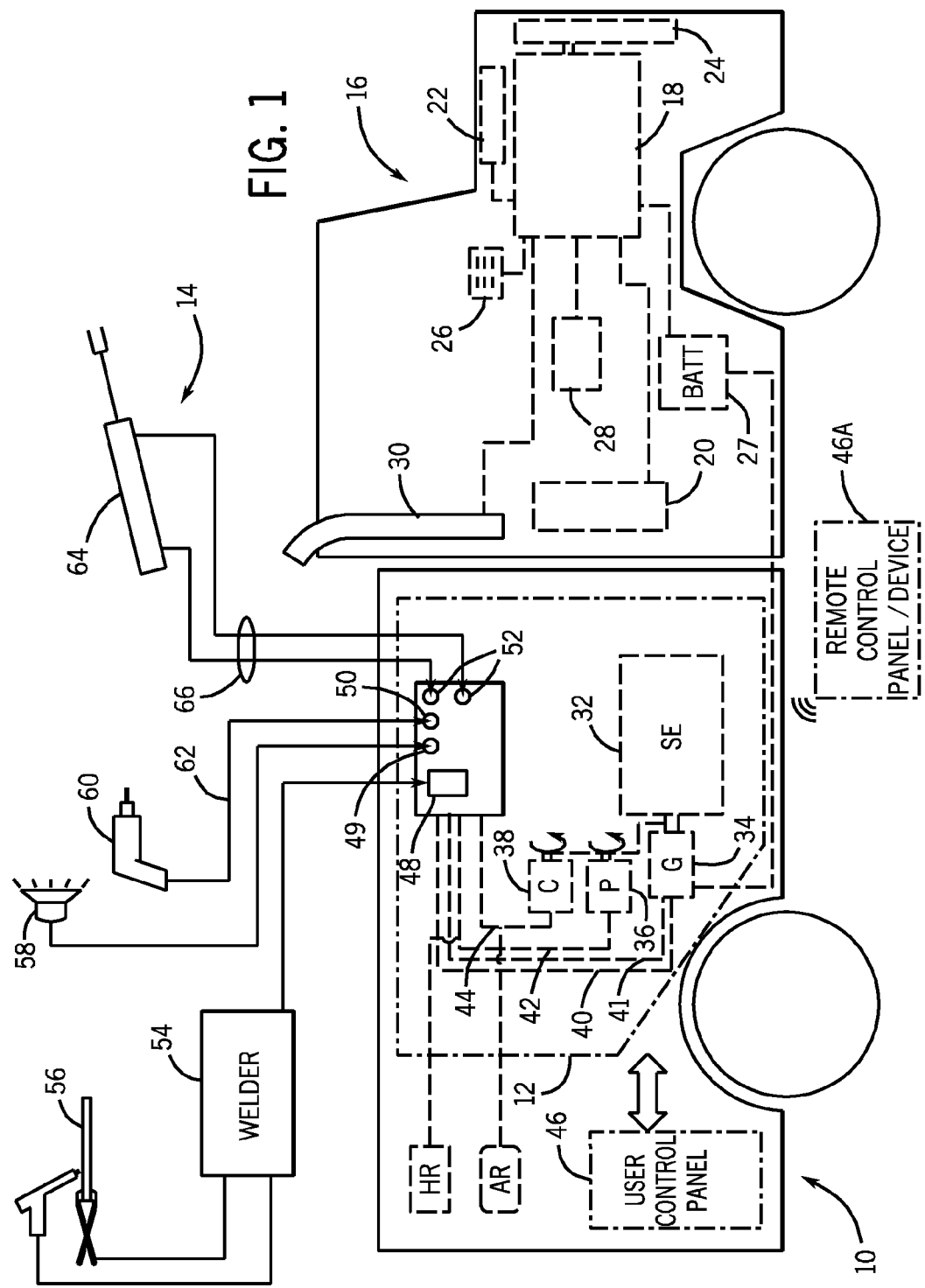
FIG. 1 is a diagram of an embodiment of a work vehicle having a service pack with a hydraulic output control system in accordance with the present embodiments.

As discussed below, the present disclosure provides a uniquely effective solution to the control of hydraulic output in various applications. Thus, the disclosed embodiments relate or deal with any application where a prime mover or power source that is engine driven intermittently powers a load or combination of loads. In certain embodiments, the disclosed hydraulic output control techniques may be used with various service packs and/or hydraulic pumps to prevent unnecessary or wasteful emissions of a power source that is coupled to multiple loads, specifically one or more hydraulic loads. For example, the disclosed embodiments may be used in combination with any and all of the embodiments set forth in U.S. application Ser. No. 11/742,399, filed on Apr. 30, 2007, and entitled "ENGINE-DRIVEN AIR COMPRESSOR/GENERATOR LOAD PRIORITY CONTROL SYSTEM AND METHOD," which is hereby incorporated by reference in its entirety. By further example, the disclosed embodiments may be used in combination with any and all of the embodiments set forth in U.S. application Ser. No. 11/943,564, filed on Nov. 20, 2007, and entitled "AUXILIARY SERVICE PACK FOR A WORK VEHICLE," which is hereby incorporated by reference in its entirety.

As discussed below, the present embodiments may utilize any one or a combination of user input, load sensing from the activation of a trigger, or load sensing from engine output to determine an amount of hydraulic output suitable for a given task. As an example, a user may select from various control schemes for a hydraulic system, such as a fine control mode, a manual mode, and/or an automatic mode. Depending on the type of mode selected, the hydraulic system may limit hydraulic output to allow fine control of a given hydraulic load, such as a crane, or may automatically select a suitable amount of hydraulic output depending on an amount of activation of a trigger that activates the hydraulic output. To allow the hydraulic system to perform such tasks, the system may include a service pack having an engine. The engine is generally coupled a hydraulic pump. The hydraulic pump supplies the hydraulic output mentioned above to the hydraulic load, such as a crane. A control system is also provided to control the hydraulic output. The control system includes a fine control mode configured to lock the engine in a low speed and control the hydraulic output in proportion to a percentage of a trigger activation. The control system also includes an auto control mode and a manual control mode. In the auto control mode, the operating speed of the engine is varied between the low speed and a high speed in proportion to the percentage of the trigger activation. The hydraulic output is also controlled in proportion to the percentage of the trigger activation in the auto control mode. In the manual control mode, the operating speed of the engine is locked in a manually selected speed, and the hydraulic output is controlled in proportion to the percentage of the trigger activation.

Keeping in mind that the present embodiments relate to hydraulic output for a variety of different hydraulic systems, the present disclosure will discuss the present embodiments in the context of a service pack integral with or mounted to a work vehicle. One embodiment of such a work vehicle 10 is depicted in FIG. 1. The work vehicle 10 is shown as a work truck, although the work vehicle 10 may have any other suitable configuration. In the illustrated embodiment, the vehicle 10 includes a service pack 12 for supplying various services (e.g., electrical, compressed air, and hydraulic power) to a range of applications 14. As discussed in detail below with respect to FIG. 5, the service pack 12 includes a hydraulic output control system configured allow the fine adjustment of cranes or any hydraulic load. The vehicle 10 has a main vehicle power plant 16 based around a vehicle engine 18. The main vehicle engine 18 may include a spark ignition engine (e.g., gasoline fueled internal combustion engine) or a compression ignition engine (e.g., a diesel fueled engine).

The vehicle power plant 16 includes a number of support systems. For example, the engine 18 consumes fuel from a fuel reservoir 20, e.g., one or more liquid fuel tanks. An air intake or air cleaning system 22 supplies air to engine 18, which may, in some applications, be turbo charged or super charged. A cooling system 24, e.g., a radiator, circulation pump, a thermostat-controlled valve and a fan, provides for cooling the engine 18. The vehicle power plant 16 also includes an electrical system 26, which may include an alternator or generator, along with one or more system batteries 27. The vehicle power plant 16 also includes a lube oil system 28. Finally, the power plant 16 includes an exhaust system 30.

The service pack 12 may include one or more service systems driven by a service engine 32. Generally, the service pack 12 provides electrical power, hydraulic power, and compressed air for the applications 14. In the diagrammatical representation of FIG. 1, for example, the service engine 32 drives a generator 34 as well as a hydraulic pump 36 and air compressor 38. The hydraulic pump 36 may be based on any suitable technology, such as piston pumps, gear pumps, vane pumps, with or without closed-loop control of pressure and/or flow. In certain embodiments, the pump 36 may include a constant displacement pump, a variable displacement pump, a plurality of pumps in a parallel or series configuration, or a combination thereof. As discussed in detail below, the service pack 12 may monitor the application of hydraulic loads (e.g., via trigger position). In response to the load, the service pack 12 may adjust the output of the service engine 32 and/or the hydraulic pump 36. For example, in order to provide sufficient power and/or control for an applied hydraulic load, a control system, discussed in further detail below, in some embodiments, functions to adjust the speed of the engine 32 and/or the position of a valve that controls the level of output of the hydraulic pump 36. Further, the control system may limit the speed of the service engine 32 and/or the output of the hydraulic pump when appropriate, such as when set to the manual or the fine control mode mentioned above.

Like the hydraulic pump 36, the generator 34 may be directly driven by the engine 32. For example, the generator 34 may be close coupled to the engine 32, or may be belt or chain driven, where desired. The air compressor 38 may be of any suitable type, such as a rotary screw air compressor or a reciprocating piston air compressor. Of course, the systems of the service pack 12 include appropriate conduits, wiring, tubing and so forth for conveying the service generated by these components to an access point, and for control by a control system. Convenient access points will be located around the periphery of the vehicle, such as access to a mode select button that may allow a user adjust settings and/or select the mode that is desired with respect to the operation of the hydraulic system. In one embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply). The hydraulic pump 36 is coupled to hydraulic circuit 42 and the air compressor 38 is coupled to an air circuit 44.

As represented generally in FIG. 1, the generator 34 is also coupled to the vehicle electrical system, and particularly to the vehicle battery 27. Thus, as described below, not only may the service pack 12 allow for 12 volt loads to be powered without operation of the main vehicle engine 18, but the vehicle battery 27 may serve as a shared battery, and is maintained in a state of charge by the service pack 12 generator output. Indeed, as described in further detail below, the control system may monitor the level of charge of the vehicle battery 27 to ensure substantially continuous monitoring of applied loads, power consumption, and so forth.

The cabling and conduits 40, 41, 42 and 44 may, as in the illustrated embodiment, route service for all of these systems directly from connections on the service pack 12. In one embodiment, for example, connections are provided at or near a base of an enclosure of the service pack 12, such that connections can be easily made without the need to open the enclosure. Moreover, certain control functions may be available from a control and service panel 46. For example, the service panel 46 may be located on any surface of the vehicle 10, or on multiple locations in the vehicle 10. The control and service panel 46 may permit, for example, a user to adjust settings of the hydraulic control system. Other controls for the service engine 32 may also be provided on the control and service panel 46. The control and service panel 46 may also provide operator interfaces for monitoring the service engine 32, such as fuel level gages, pressure gages, as well as various lights and indicators for parameters such as pressure, speed, and so forth.

As also illustrated in FIG. 1, a remote control panel or device 46A may also be provided that may communicate with the control panel 46 or directly with the service pack 12 via cabling or wirelessly. In a manner similar to conventional crane or manlift controls, then, the operator may control or activate the hydraulic output, as well as other functions of the service pack 12 (e.g., engagement or disengagement of a clutched component, such as an air compressor) without directly accessing either the components within the service pack enclosure or the control panel 46.

As noted above, any desired location may be selected as a convenient access point for one or more of the systems of the service pack 12. In the illustrated embodiment, for example, one or more alternating current electrical outputs, which may take the form of electrical receptacles 48 (for AC power) and 49 (for 12 volt DC power) are provided. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC electrical output 48, and may provide constant current or constant voltage-regulated power suitable for a welding application. The welder 54 may receive power from the electrical output of the generator 34, and itself contain circuitry designed to provide for appropriate regulation of the output power provided to cables suitable for a welding application 56.

Similarly, DC loads may be coupled to the DC receptacle 49. Such loads may include lights 58, or any other loads that would otherwise be powered by operation of the main vehicle engine 18. As mentioned above, the 12 volt DC output of the service pack 12 also serves to maintain the charge of the vehicle battery 27, and to power any ancillary loads that the operator may need during work (e.g., cab lights, hydraulic system controls, control system and load monitors, etc.).

The pneumatic and hydraulic applications may be similarly coupled to the service pack 12 as illustrated in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic service 52 by appropriate hoses or conduits 66. Certain of the applications illustrated diagrammatically in FIG. 1 may be incorporated into the work vehicle 10. For example, the work vehicle 10 may be designed to include a man lift, scissor lift, hydraulic tail gate, or any other driven systems, which can be coupled to the service pack 12 and driven separately from the main vehicle engine 18.

In use, the service pack 12 may provide power for the on-site applications 14 substantially separately from the vehicle engine 18. That is, the service engine 32 generally may not be powered during transit of the vehicle 10 from one service location to another, or from a service garage or facility to a service site. Once located at the service site, the vehicle 10 may be parked at a convenient location, and the main engine 18 may be shut down. The service engine 32 may then be powered to provide service from one or more of the service systems (e.g., generator 34, hydraulic pump 36, and air compressor 38) described above. The service pack 12 also may include clutches, or other mechanical engagement devices, for selective engagement and disengagement of one or more of the generator 34, the hydraulic pump 36, and the air compressor 38, alone or in combination with one another.

Figure 2:
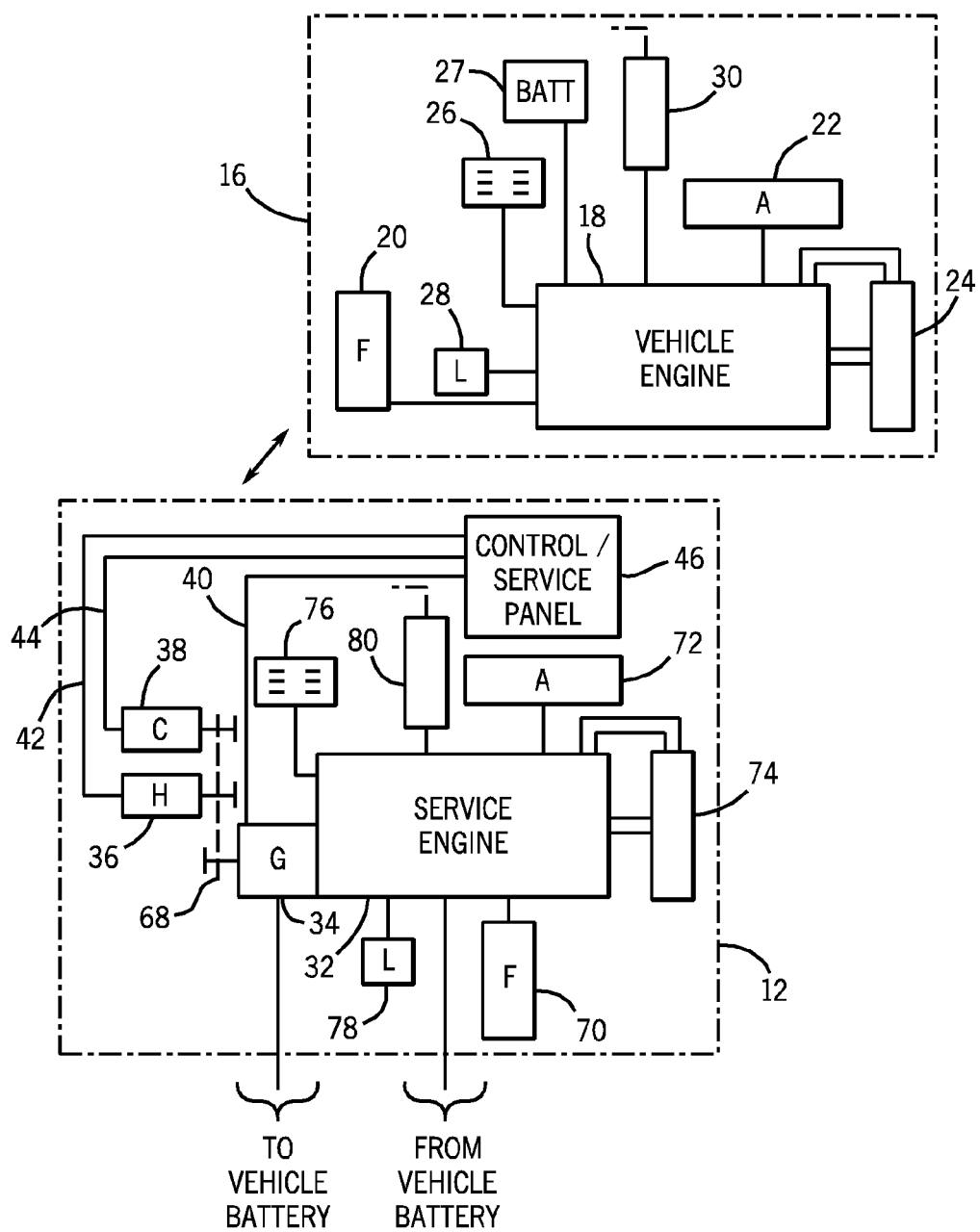
FIG. 2 is a diagram of an embodiment of power systems in the vehicle of FIG. 1, illustrating support systems of the service pack separate and independent from support systems of a vehicle engine.

Several different scenarios may be envisaged for driving the components of the service pack 12, and for integrating or separating the support systems of the service pack 12 from those of the vehicle power plant 16. One such approach is illustrated in FIG. 2, in which the service pack 12 is independent and operates separately from the vehicle power plant 16. In the embodiment illustrated in FIG. 2, as shown diagrammatically, the support systems for the vehicle power plant 16 are coupled to the vehicle engine 18 in the manner set forth above. The service pack 12 reproduces some or all of these support systems for operation of the service engine 32. In the illustrated embodiment, for example, these support systems include a separate fuel reservoir 70, a separate air cleaner system 72, a separate cooling system 74, a separate electrical protection and distribution system 76, a separate lube oil system 78, where desired for the engine, and a separate exhaust system 80.

Many or all of these support systems may be provided local to the service engine 32, that is, at the location where the service engine 32 is supported on the vehicle 10. On larger work vehicles, access to the location of the service engine 32 and the service pack 12 in general, may be facilitated by the relatively elevated clearance of the vehicle 10 over the ground. Accordingly, components such as the fuel reservoir, air cleaner, cooling system radiator, electrical fuse box, and so forth may be conveniently positioned so that these components can be readily serviced. Also, in the illustrated embodiment, the hydraulic pump 36 and air compressor 38 are illustrated as being driven by a shaft extending from the generator 34, such as by one or belts or chains 68. As noted above, one or both of these components, or the generator 34 may be provided with a clutch or other mechanical disconnect to allow them to idle while other systems of the service pack are operative.

FIG. 3 represents an alternative configuration in which the service pack support systems are highly integrated with those of the main vehicle power plant 16. In the illustration of FIG. 3, for example, all of the systems described above may be at least partially integrated with those of the vehicle power plant 16. Thus, coolant lines 82 are routed to and from the vehicle cooling system 24, while an air supply conduit 84 is routed from the air intake or cleaner 22 of the vehicle engine. Similarly, an exhaust conduit 86 routes exhaust from the service engine 32 to the exhaust system 30 of the vehicle engine 18. The embodiment of FIG. 3 also illustrates integration of the electrical systems of the vehicle 10 and the service pack 12, as indicated generally by the electrical cabling 88 which routes electrical power to the distribution system 26 of the vehicle. The systems may also integrate lube oil functions, such that lubricating oil may be extracted from both crank cases in common, to be cleaned and cooled, as indicated by conduit 90. Finally, a fuel conduit 92 may draw fuel from the main reservoir 20 of the vehicle, or from multiple reservoirs where such multiple reservoirs are present on the vehicle.

In some embodiments, integrated systems of particular interest include electrical and fuel systems. For example, while the generator 34 of the service pack 12 may provide 110 volt AC power for certain applications, its ability to provide 12 volt DC output is particularly attractive to supplement the charge on the vehicle batteries, for charging other batteries, and so forth. The provision of both power types, however, makes the system even more versatile, enabling 110 volt AC loads to be powered (e.g., for tools, welders, etc.) as well as 12 volt DC loads (e.g., external battery chargers, portable or cab-mounted heaters or air conditioners, etc.).

In certain embodiments, a system may include an integration solution between those shown in FIG. 2 and FIG. 3. For example, some of the support systems may be best separated in the vehicle 10 both for functional and mechanical or flow reasons. The disclosed embodiments thus contemplate various solutions between those shown in FIG. 2 and FIG. 3, as well as some degree of elimination of redundancy between these systems. In a presently contemplated embodiment, at least some of the support systems for the primary vehicle engine 18 are used to support the service pack 12 power plant. For example, at least the fuel supply and electrical systems can be at least partially integrated to reduce the redundancy of these systems. The electrical system may thus provide certain support functions when the vehicle engine is turned off, removing dependency from the electrical system, or charging the vehicle batteries 27. Similarly, heating, ventilating and air conditioning systems may be supported by the service pack engine 32, such as to provide heating of the vehicle cab when the primary engine 18 is turned off. Thus, more or less integration and removal of redundancy is possible. In this way, it should be noted that the hydraulic control system embodiments described herein may be at least partially integrated with the vehicle. For example, hydraulic output control may be done through monitoring a hydraulic load signal, or as a direct communication of the hydraulic load through a controller area network (CAN) bus within the vehicle. As such, the methods of output control as described herein may also include varying the vehicle engine 18 in addition to or in lieu of the service engine 32. For example, in embodiments where many hydraulic loads are being applied to the service engine 32, the controller may allow the vehicle engine 18 to provide additional power to avoid or at least mitigate the possibility of engine overload.

The foregoing service pack systems may also be integrated in any suitable manner for driving the service components, particularly the generator 34, hydraulic pump 36, and air compressor 38, and particularly for powering the on-board electrical system, including a control system or similar feature. FIGS. 4A-4C illustrate diagrams of certain implementations for driving these components from the service engine 32. In the embodiment illustrated in FIG. 4A, the generator 34 may be close-coupled to the output of the engine 32, such as directly to the engine fly wheel or to a shaft extending from the engine 32. A sheave 94 is mounted to an output shaft extending from the generator, and similar sheaves 96 and 98 are coupled to the hydraulic pump 36 and air compressor 38. One or more belts 38 and/or clutches are drivingly coupled between these components, and an idler 100 may be provided for maintaining tension on the belt. Such an arrangement is shown in FIG. 4B, in which the hydraulic pump 36 is driven through a clutch 102, such as an electric clutch. It should be noted that any one of the components may be similarly clutched to allow for separate control of the components. Such control may be useful for controlling the power draw on or the output by the engine 32, for example when no load is drawn from the particular component over a period of time, and when the component is not needed for support of the main vehicle engine systems (e.g., maintaining a charge on the vehicle batteries).

These components may be supported in any suitable manner, and may typically include some sort of rotating or adjustable mount such that the components may be swung into and out of tight engagement with the belt to maintain the proper torque-carrying tension on the belt and avoid slippage. Other arrangements, such as chain drives, may also be envisaged. In other arrangements, one or more of the components may be gear driven, with gearing providing any required increase or decrease in rotational speed from the output speed of the engine 32, such as when automatic control of hydraulic output has been selected by a user. In FIG. 4C, a support adapter 104 mounts the generator 34 on the service engine 32, and the hydraulic pump 36 and air compressor 38 are driven by a gear reducer.

The particular component or components that are directly and/or indirectly driven by the engine 32 may be selected based upon the component and engine specifications. For example, it may be desirable to directly drive the hydraulic pump 36, and to drive the generator 34 via a belt or gear arrangement, permitting the engine 32 to operate at a higher speed (e.g., above 3000 RPM) while allowing a reduced speed to drive the generator or to allow fine hydraulic control (e.g., 1800 RPM).

Figure 5:
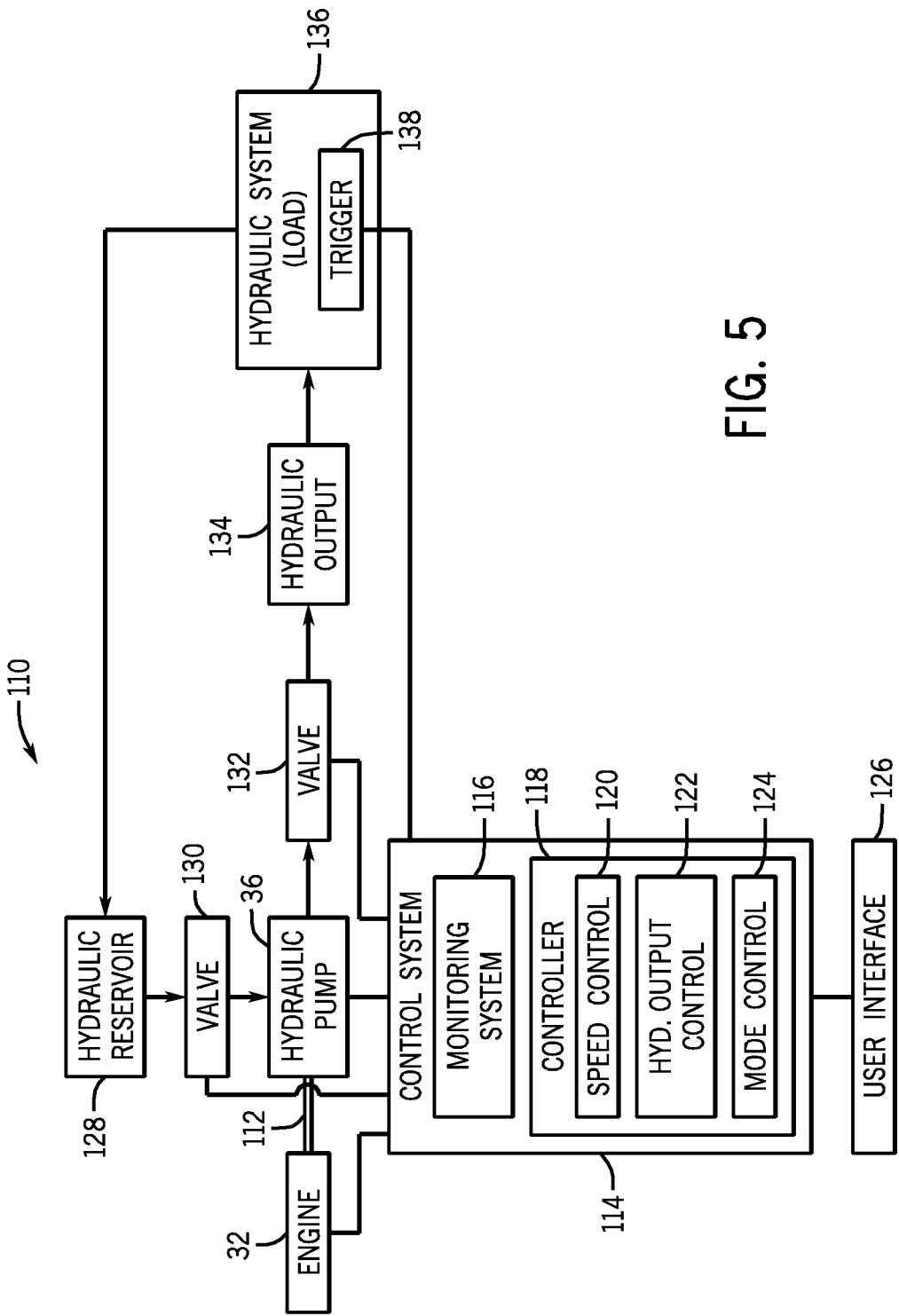
FIG. 5 is a block diagram illustrating an embodiment of a hydraulic power supply system for the service pack of FIGS. 1-4, wherein the hydraulic power supply system includes a controller that is configured to receive signals indicative of load demand from one or more hydraulic loads.

As noted above, the present disclosure is directed towards the control of hydraulic output in a system, such as the system described above. Thus, as mentioned above, the discussion of the service pack 12 is provided herein to facilitate discussion of the present approaches. Moving now specifically to the control of the hydraulic system, a presently contemplated embodiment of a hydraulic output control system 110 is illustrated in FIG. 5 in the form of a block diagram. The hydraulic output control system 110, as illustrated, includes the hydraulic pump 36 drivingly connected to the service engine 32 via shaft 112. The hydraulic pump 36 is in electronic communication with a control system 114 that receives feedback (e.g., load information, trigger position information, valve positioning, and engine speed) and also sends control signals to various components of the system 110 to control hydraulic flow rate and/or hydraulic pressure of the hydraulic pump 36. In this way, the control system 114 includes features for monitoring and control, such as a monitoring system 116 and a controller 118, respectively. In some embodiments, the monitoring system 116 and the controller 118 may be integral, for example as an application-specific or general purpose computer. Generally, the controller 118 includes a processor that is configured to execute one or more algorithms for performing the monitoring and control schemes described herein. For example, the controller 118 may have features for speed control 120 (e.g., for the engine 32), hydraulic output control 122 (e.g., for valves connected to the hydraulic pump 36), and for mode control 124 (e.g., to allow manual, automatic, and/or fine control). As an example, the control system 114 may change the speed of the engine 32 between a number of speeds ranging from a low speed to a high speed (e.g., between about 1800 rpm and about 3600 rpm). The control system 114 may also be in communication with a user interface 126 that allows a user to configure certain parameters, such as limits, times, outputs, engine speeds, and so forth. As an example, the user interface 126 may include any or a combination of a display, a keyboard, a mouse, a trackball, a touch screen, a keypad, or the like.

As noted above, during operation, the control system 114 may control operation of the hydraulic output control system 110 to an extent indicated or predetermined by a user. Keeping in mind that the control system 114 may generally control operation of the system 110, the delivery of hydraulic power by the engine 32 and hydraulic pump 36 is described herein. During operation, the hydraulic pump 36 receives a hydraulic fluid (e.g., water, oil) from a hydraulic reservoir 128. The amount of hydraulic fluid that the hydraulic pump 36 receives from the hydraulic reservoir 128 may generally be determined by the position of an inlet valve 130 disposed between the reservoir 128 and the pump 36. Again, as illustrated, the inlet valve 130 is in communication with the control system 114 to allow positioning information to be shuttled back and forth. That is, the control system 114 may send control signals (e.g., electrical, pneumatic, etc.) to the inlet valve 130 to open, close, or otherwise adjust the position of the valve 130. In a general sense, the more hydraulic power needed, the more hydraulic fluid will be provided to the pump 36 by opening the valve 130. The hydraulic pump 36 then pressurizes the hydraulic fluid using power from the engine 32, the speed of which is both provided to and determined at least partially by the control system 114. In this way, when the engine speed increases, so does the hydraulic power provided by the hydraulic pump 36.

The amount of pressurized fluid that exits the hydraulic pump 36 may be at least partially determined by an outlet valve 132 (e.g., a solenoid valve), which is also in communication with the control system 114. In this way, the position of the valve 132 may be provided to the control system 114 as feedback, and the control system 114 may send control signals (e.g., electrical or pneumatic) to adjust the position of the valve 132. Thus, the control system 114, along with user input, may determine the level of hydraulic output 134 by the hydraulic pump 36. In other words, either or both of the valves 130, 132 are configured to vary the flow rate and/or the pressure of a hydraulic fluid entering in and/or leaving the hydraulic pump 36 to vary the hydraulic output 134. The hydraulic output 134 may be considered the driving force for powering a hydraulic system 136 (e.g., a hydraulic load such as a crane). The hydraulic system 136 may be operated by a user via a trigger 138. The trigger 138 may include features for providing a signal representative of the trigger position to the control system 116, such as a potentiometer or similar feature, so that the control system 116 and/or the user may make adjustments to the hydraulic output 134 as needed. In some embodiments, the control system 116 may also receive a signal indicative of the hydraulic load. For example, there may be a direct communication of the hydraulic load from the hydraulic system 136 to the control system 114. In another example, the hydraulic system 136 may be connected to a CAN bus of the service vehicle 10. In such an arrangement, the control system 116 may receive hydraulic load information from the CAN bus in addition to or in lieu of direct communication with the hydraulic system 136. As noted above, the hydraulic system 136 uses the hydraulic output 134 as a source of power. In doing so, the pressurized fluid that is the hydraulic output 134 becomes de-pressurized, and is then returned to the hydraulic reservoir 128 for re-pressurization at the hydraulic pump 36.

It should be noted from the block diagram of FIG. 5 that the control system 114 may perform a variety of functions so as to control the amount of hydraulic output 134 provided by the hydraulic pump. As noted above, the control system 114 may fully control the speed of the engine 32 and the respective positions of valves 130, 132, or the speed of the engine 32 may be manually selected. When the speed of the engine 32 is manually selected, the engine 32 may be locked in a low speed (e.g., about 1800 rpm), a medium speed (e.g., about 2600 rpm), a medium-high speed (e.g., about 3200 rpm), or a high speed (e.g., about 3600 rpm), or may be set to any desired speed. In each mode where the speed of the engine 32 is selected, either automatically or manually by a user, the control system 114 may perform a series of acts according to the selected mode. A process flow diagram describing such acts is illustrated in FIG. 6, which may be implemented by software stored on memory in one or more circuits within the control system 114.

Figure 6:
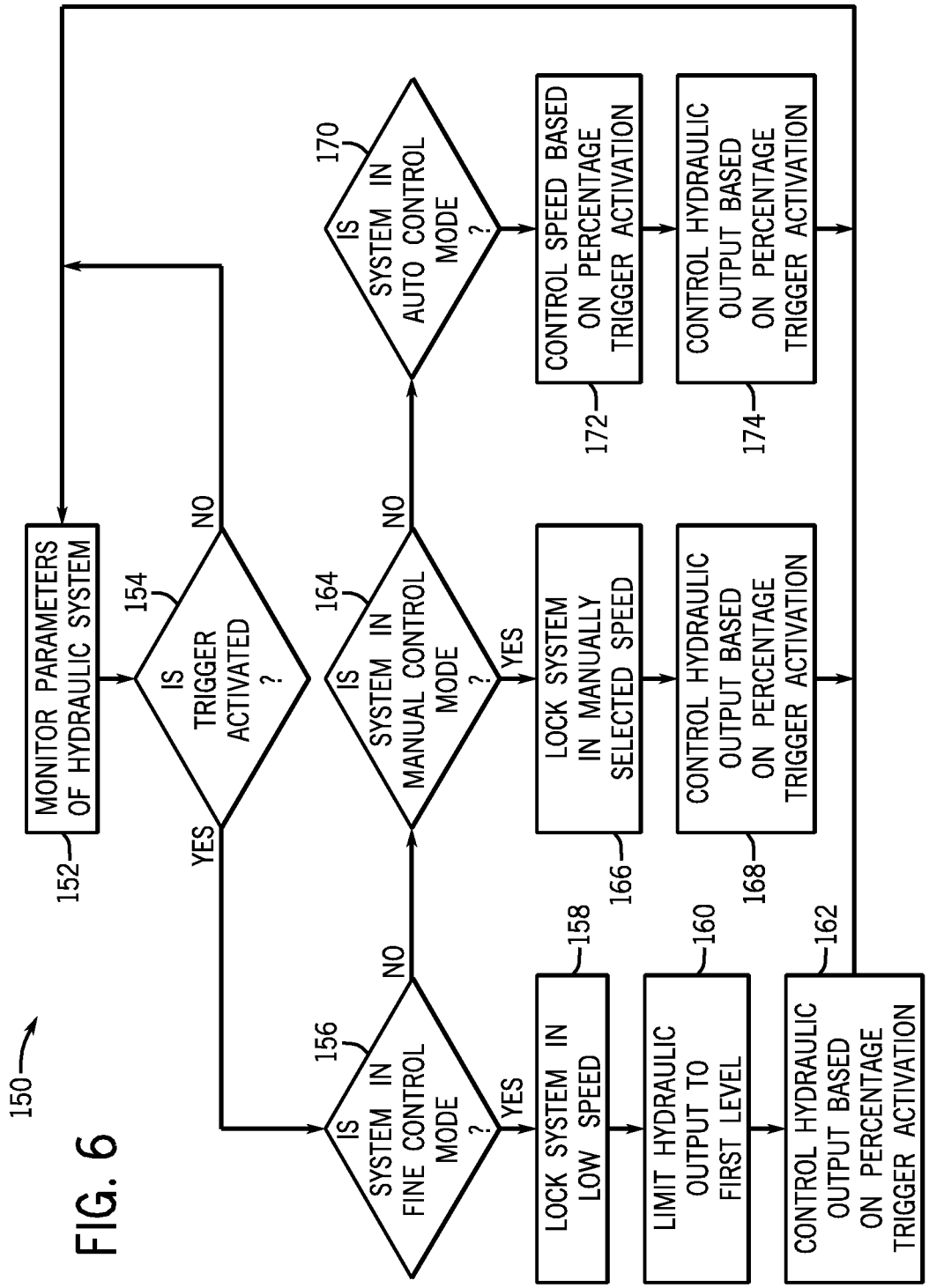
FIG. 6 is a process flow diagram illustrating an embodiment of a hydraulic output control method performed by the controller of FIG. 5.

Specifically, FIG. 6 depicts a process flow diagram of a method 150 for controlling hydraulic output of the hydraulic output control system 110. The method 150 begins with monitoring various parameters of the hydraulic system (block 152). As an example, the monitoring system 116 may monitor the hydraulic load 136, the hydraulic output 134, the position of the valves 130, 132, the speed of the engine 32, and the operation of the hydraulic pump 36. The method 150 then determines if the trigger 138 has been activated (query 154), for example if a hydraulic load is presently being applied. In situations where the trigger 138 has not been activated, the method 150 returns to the acts represented by block 152.

In situations where the trigger 138 has indeed been activated, the method 150 then determines the mode that the system 110 is in based on a series of queries. In the illustrated embodiment, there are three queries. However, it should be noted that there may be more or less queries depending on the number of modes available to the system 110, among other factors. The first query is whether the system 110 is in fine control mode (query 156), for example to allow fine positioning of a hydraulic crane. In situations where the system 110 is indeed in fine control mode, the method 150 then proceeds to lock the system 110 (e.g., the engine 32) in low speed (block 158). As noted above, a low speed is a speed that is lower relative to a medium or high speed of the engine 32. As an example, the low speed may be less than or equal to about 60% of the high speed. For example, the low speed may be about 10%, 20%, 30%, 40%, or 50% of the high speed. Once the system 110 is in low speed, the hydraulic output 134 is then limited to a first level (block 160). As an example, the hydraulic output 134 by the hydraulic pump 36 may be limited to between about 1 to 75, 1 to 50 or 1 to 25 percent of the highest operating output of the pump 36. In one embodiment, the hydraulic output 134 may be limited to no more than about 5 gallons per minute (gpm) when the highest operating output is about 20 gpm. In other words, the output may be limited to no more than about 25% in some embodiments. While the hydraulic output 134 is limited to a first level (block 160), the method also progresses to controlling the hydraulic output 134 based on a percentage of trigger activation (block 162). For example, the controller 114 may control the positions of either or both valves 130, 132 so as to limit the amount of pressurized fluid that the hydraulic pump 36 produces to an amount suitable for fine control of the hydraulic system 136 (e.g., a crane). Of course, while the control system 114 controls the hydraulic output 134, the method 150 may also call for the parameters mentioned above to be monitored. That is, the method 150 progresses to the acts represented by block 152.

Returning now to the series of queries mentioned above, in embodiments where the system 110 is not in fine control mode, the method 150 progresses to determining whether the system 110 is in a manual control mode (query 164). In situations where the system 110 is indeed in manual control mode, for example if the user has manually selected a speed for the engine 32, the method 150 then progresses to locking the system 110 in the manually selected speed (block 166). As an example, the user may select from a low-medium, a medium, a medium-high, or a high speed. The control system would then maintain the speed of the engine 32 at the desired relative level until the user provides an indication to change or otherwise control the speed of the engine 32. While the system 110 is locked in the manually-selected speed, the method 150 then progresses to controlling the hydraulic output 134 based on the percentage of trigger activation (block 168). As above, while such control is performed, the method 150 progresses to the acts represented by block 152.

In situations where the system 110 is not in manual control mode, the method 150 then determines if the system 110 is in auto control mode (query 170). It should be noted that in situations where the system 110 is not in a fine or manual control mode, that it will most likely be under some form of automatic control. However, it is presently contemplated that other modes are possible, such as mixtures of fine, manual, and/or auto control. In situations where the system 110 is indeed in auto control mode, the method 150 then calls for the control system 114 to control the speed of the engine 32 based on the percentage of trigger activation (block 172). For example, at a first percentage of trigger activation, the engine 32 may be maintained at a first speed. The engine 32 may remain at the first speed until the percentage trigger activation reaches a second percentage, at which time the speed of the engine 32 may be increased (or decreased) to a second speed, and so on. That is, the increase in engine speed may be discrete steps, for example 1 to 10 steps, 1 to 20 steps, 1 to 30 steps, or more. The number of such steps may be determined by the number of speeds available at the engine 32. Therefore, if the engine 32 has 10 speeds, there may be 10 steps as described above. In other embodiments, the increase and/or decrease in engine speed may be continuously variable, such that there are substantially no discrete steps when changing engine speed. Substantially simultaneously to performing the acts represented by block 172, the method 150 may call for the hydraulic output 134 to be controlled based on the percentage trigger activation (block 174), for example by adjusting either or both valves 130, 132. It should be noted that the trigger activation percentages at which the engine 32 changes speeds may or may not correlate to the trigger activation percentages at which the hydraulic output 134 is adjusted. Of course, as the system 110 is in an auto control mode, the control system 114 may substantially continuously monitor the operational parameters of the system 110. Accordingly, the method 150 progresses to the acts represented by block 152.

Figure 7:
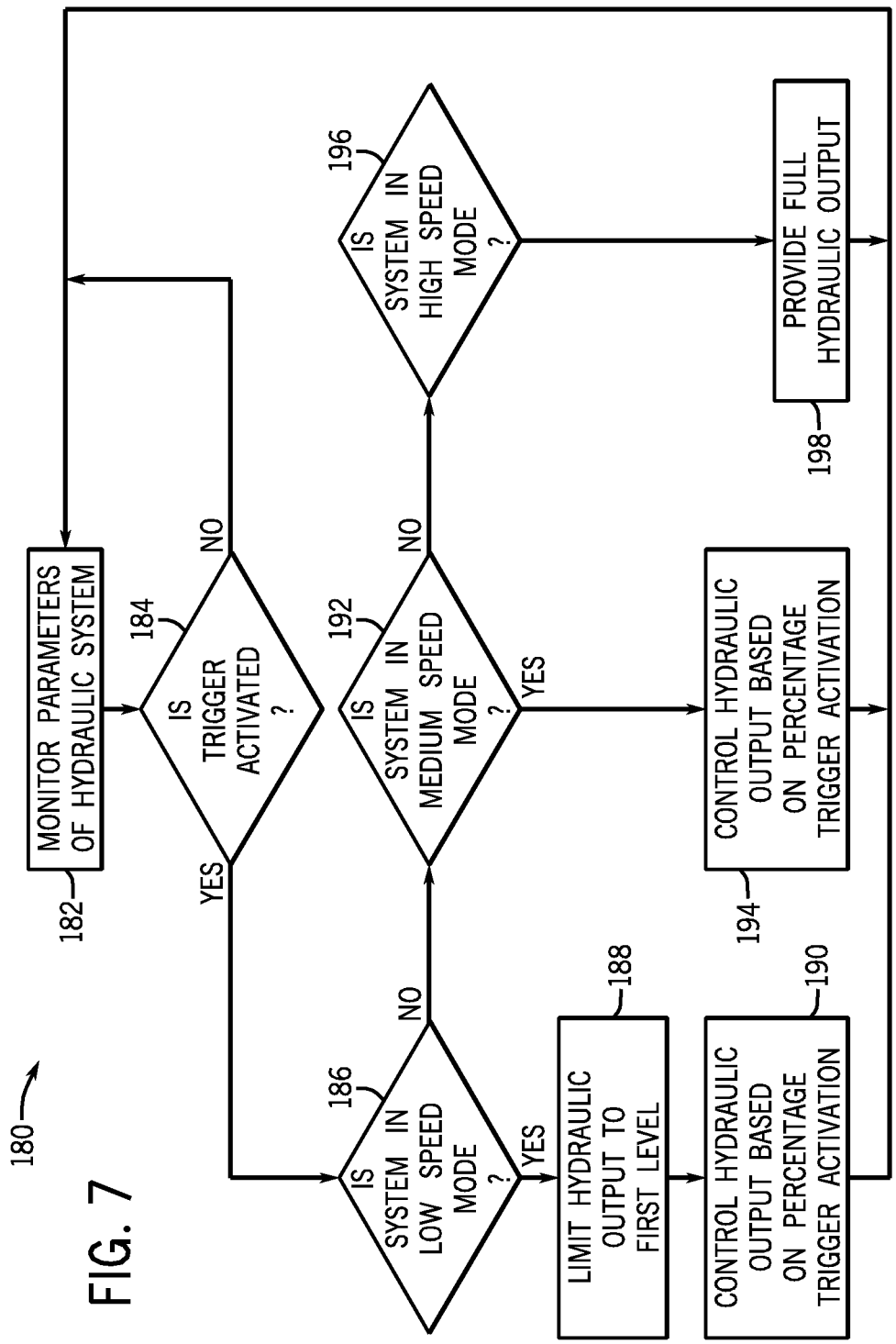
FIG. 7 is a process flow diagram illustrating an embodiment of hydraulic output control at various engine speeds.

FIG. 7 illustrates a process flow diagram of an embodiment of a method 180 for controlling the hydraulic output 134 based on the speed of the system 110. The method 180 begins with the control system 114 (i.e., monitoring system 116) monitoring various parameters of the system 110 (block 182). Such acts may be similar to those described above with respect to block 152. The method 180 may then determine if the trigger has been activated (query 184) in a manner similar to that described above with respect to FIG. 6. In situations where the trigger 138 has not been activated, the system 114 continues monitoring. However, in situations where the trigger 138 is indeed activated, the method 180 then calls for the control system 114 to determine the proper course of action by performing a series of queries relating to the speed of the engine 32. In a first query, the control system 114 determines whether the system 110 is in a low speed (query 186), for example if the system 110 has been set to a low speed manually or if the monitoring system 116 determines that the hydraulic load is minimal. In situations where the system 110 is in low speed, the method 180 calls for the control system 114 to limit the hydraulic output 134 to a first level (block 188), as described above. While the hydraulic output 134 is limited, the hydraulic output 134 is controlled based on the percentage of trigger activation (block 190). The control system 114 then continues monitoring according to the acts represented by block 182.

In situations where the system 110 is not in a low speed mode, the method 180 then progresses to determining whether the system 110 is in a medium speed mode (query 192). If the system 110 is at a medium speed, the control system 114 then controls the hydraulic output 134 based on the percentage of trigger activation (block 194). In this way, when at a medium speed, the system 110 can provide a range of hydraulic outputs.

In situations where the system 110 is not in a medium speed mode, the method 180 then progresses to determining whether the system 110 is in a high speed mode (query 196). In situations where the system 110 is in a high speed mode, then the system 110 will provide full hydraulic output (block 198). As an example, the control system 114 may fully open the valves 130, 132 to allow the system 110 to provide maximum pressurized fluid flow. Of course, while the system 110 is providing the hydraulic output 134, the control system 114 may also continue monitoring in accordance with block 182.

Figure 8:
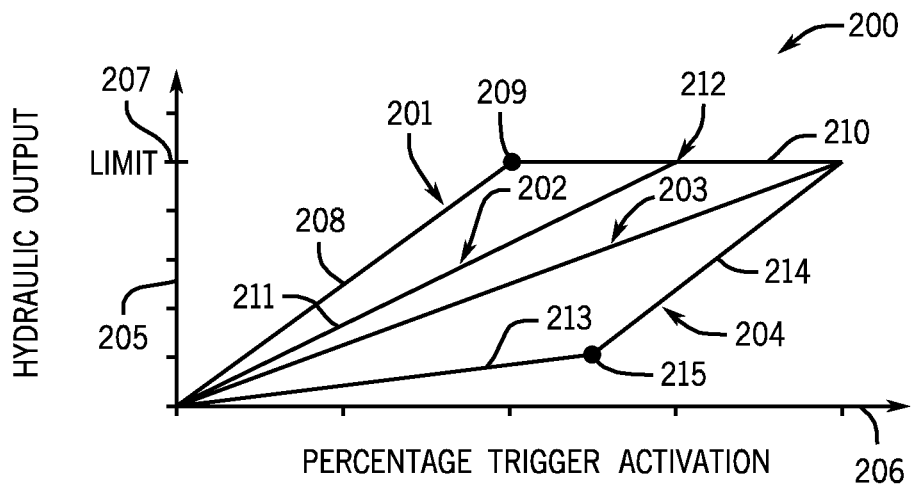
FIG. 8 is a combined plot of embodiments of linear relationships between hydraulic output and percentage trigger activation in a fine control mode.
Figure 9:
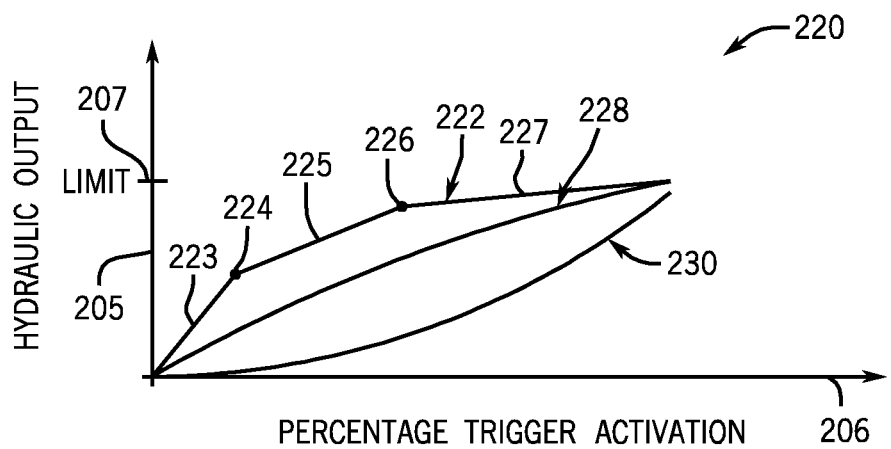
FIG. 9 is a combined plot of embodiments of non-linear relationships between hydraulic output and percentage trigger activation in a fine control mode.
Figure 10:
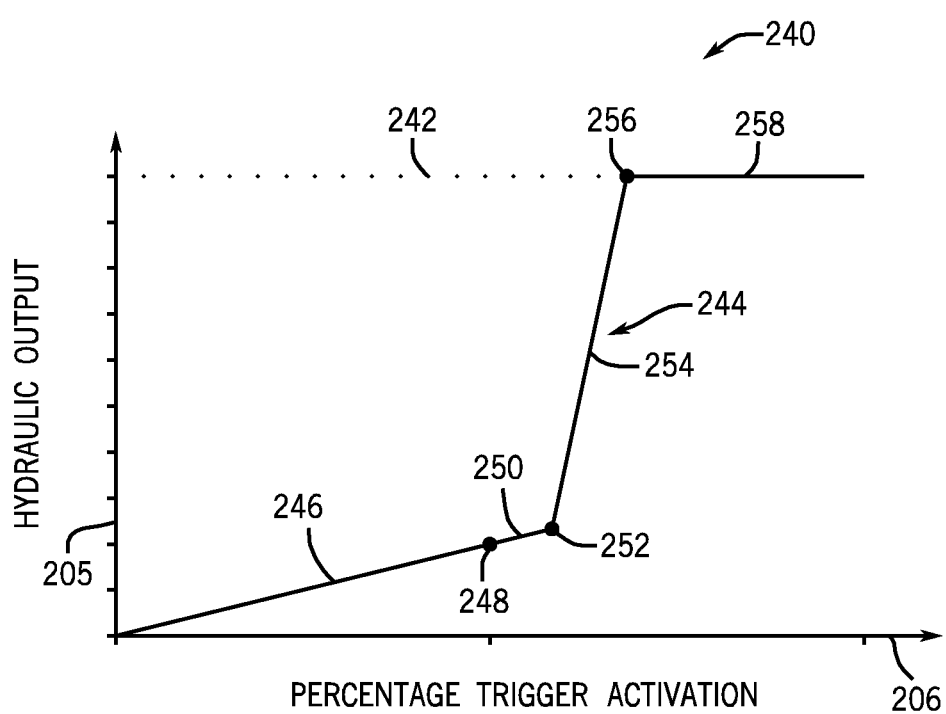
FIG. 10 is a plot of one embodiment of the relationship between trigger activation and hydraulic output in the automatic control mode.

It should be noted that many of the control schemes and algorithms discussed herein utilize a proportional relationship between trigger activation and hydraulic output. Accordingly, several examples of such relationships are provided with respect to FIGS. 8-10. Specifically, FIG. 8 illustrates embodiments of the proportional relationships in the form of linear plots of hydraulic output as a function of percentage trigger activation in the fine control mode. FIG. 9 illustrates similar embodiments that exhibit non-linear relationships. FIG. 10 illustrates one embodiment of the relationship between trigger activation and hydraulic output in the automatic control mode. It should be noted that the plots illustrated herein with respect to FIGS. 8-10 are merely intended to be examples and are not intended to limit the scope of the present disclosure. Indeed, any or a combination of the relationships described herein may be implemented into a hydraulic output control system in accordance with present embodiments.

As noted above, FIG. 8 is a combined plot 200 of different embodiments of relationships between hydraulic output and proportional trigger activation in the fine control mode. As illustrated, the fine control mode may provide a variety of control paths 201, 202, 203, or 204 of hydraulic output 205 versus trigger activation 206. Furthermore, each path 201, 202, 203, or 204 may have a different slope, e.g., hydraulic output/trigger activation, leading to a hydraulic output limit 207. Furthermore, each path 201, 202, 203, or 204 may include a single slope or multiple different slopes. The path 201 includes a first sloped path 208 leading to the limit 207 at a point 209, followed by a level path 210 at the limit 207. Similarly, the path 202 includes a second sloped path 211 leading to the limit 207 at a point 212, followed by the level path 210 at the limit 207. The path 203 has third sloped path (i.e., single slope) leading directly to the limit 207 without any level path 210. The path 204 includes a fourth sloped path 213 and fifth sloped path 214, which change at a point 215. Subsequently, the fifth sloped path 214 of the path 204 extends directly to the limit 207 without the level path 210. The first, second, third, fourth, and fifth paths are different from one another. In the illustrated embodiment, the paths 201, 202, 203, and 204 are linear paths having one or more slops. The limit 207 may be less than 10, 20, 30, 40, 50, or 60 percent of a maximum hydraulic output 205.

Moving now to FIG. 9, a plot 220 illustrates embodiments of non-linear relationships between the amount of hydraulic output 205 and the percentage trigger activation 206. Path 222 represents a situation where there is more than one point at which the rate of hydraulic output changes. Specifically, the path 222 has a first proportional relationship 223 until point 224, at which the relationship changes to a smaller increase in hydraulic output with increasing trigger pull, or a second proportional relationship 225. Once the trigger activation reaches a point 226, the path 222 changes again to a third proportional relationship 227, and may asymptotically approach the hydraulic output limit 207. In other embodiments, the relationship may be fully non-linear, as illustrated by paths 228 and 230. Path 228 represents a decreasing rate of increase of the hydraulic output 205 with increasing trigger pull 206. However, path 230 represents an increasing rate of increase of the hydraulic output 205 with increasing trigger pull 206, or an exponential growth function that ends at the hydraulic output limit 207.

While FIGS. 8 and 9 illustrate embodiments relating to the fine control mode, FIG. 10 illustrates a plot 240 of an embodiment of the relationship between hydraulic output 205 and percentage trigger activation 206 for the auto control mode. A dashed line 242 represents the maximum hydraulic output that the hydraulic power source (i.e., the hydraulic pump 36) can provide, and a path 244 represents an example of hydraulic output at various trigger activation percentages and for various engine speeds. Section 246 of the path 244 may represent a fine control area, where the engine 32 is at a first speed (e.g., about 1800 rpm). Accordingly, the hydraulic output remains relatively low until a first point 248 is reached. At point 248, the percentage trigger activation may cause the control system 114 to send control signals to the engine 32 so as to increase the speed of the engine 32 to a second speed (e.g., about 2600 rpm). Section 250 may represent the hydraulic output 205 as a function of trigger activation 206 until a second point 252 is reached. At point 252, the hydraulic output 205 may increase by a larger amount in response to trigger activation 206, as represented by section 254. Once the trigger activation reaches a point 256, the control system 114 may send control signals to the engine 32 to increase to a third speed (e.g., about 3200 rpm or higher), allowing the system 110 to provide maximum hydraulic output, as represented by section 258.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a service pack, comprising:
an engine having an operating speed ranging from a low speed to a high speed;
a hydraulic pump coupled to the engine, wherein the hydraulic pump is configured to supply a hydraulic output to a hydraulic load;
a control system configured to control the hydraulic output, wherein the control system comprises a fine control mode configured to lock the engine in the low speed and control the hydraulic output in proportion to a percentage of a trigger activation; and
a hydraulic valve configured to vary the hydraulic output, wherein the control system is configured to control the hydraulic valve to provide a continuously variable hydraulic flow rate in the fine control mode.

2. The system of claim 1, wherein the control system is configured to restrict the hydraulic output to a range below a limit in the fine control mode.

3. The system of claim 1, wherein the fine control mode comprises a proportional control relationship between the percentage of the trigger activation and the hydraulic output.

4. The system of claim 3, wherein the proportional control relationship comprises a linear relationship between the percentage of the trigger activation and the hydraulic output.

5. The system of claim 3, wherein the proportional control relationship comprises a non-linear relationship between the percentage of the trigger activation and the hydraulic output.

6. The system of claim 1, wherein the control system comprises an auto control mode configured to vary the operating speed of the engine between the low and high speeds in proportion to the percentage of trigger activation, and the auto control mode is configured to control the hydraulic output in proportion to the percentage of the trigger activation using a combination of different discrete speeds of the engine and the hydraulic valve.

7. The system of claim 1, wherein the control system comprises a manual control mode configured to lock the operating speed of the engine in a manually selected speed, and the manual control mode is configured to control the hydraulic output in proportion to the percentage of the trigger activation.

8. The system of claim 1, wherein the low speed is less than approximately 60 percent of the high speed.

9. The system of claim 1, wherein the service pack is a portable unit having the engine, the hydraulic pump, and the control system disposed in a single enclosure.

10. The system of claim 1, comprising a vehicle having a main engine and the hydraulic load, wherein the service pack is mounted in the vehicle, and the engine is separate from the main engine.

11. The system of claim 10, wherein the hydraulic load comprises a hydraulic crane.

12. The system of claim 1, wherein the engine comprises a plurality of discrete operating speeds, the engine increases its operating speed over a plurality of discrete steps, and the control system is configured to increase the operating speed of the engine in proportion to a percentage of trigger activation when not in the fine control mode.

13. The system of claim 1, wherein the hydraulic pump is a variable displacement pump.

14. A system, comprising:
a hydraulic control system configured to control a hydraulic output from a hydraulic pump driven by an engine operable between a low speed and a high speed, wherein the hydraulic output comprises a hydraulic flow rate, and the control system comprises a fine control mode configured to lock the engine in the low speed and control the hydraulic output in proportion to a percentage of a trigger activation; and
wherein the control system is configured to control a hydraulic valve configured to vary the hydraulic output to provide a continuously variable hydraulic flow rate in the fine control mode.

15. The system of claim 14, wherein the control system is configured to restrict the hydraulic output to a range below a limit in the fine control mode.

16. The system of claim 14, wherein the control system comprises an auto control mode configured to vary an operating speed of the engine between the low and high speeds in proportion to the percentage of the trigger activation, and the auto control mode is configured to control the hydraulic output in proportion to the percentage of the trigger activation.

17. The system of claim 14, wherein the control system comprises a manual control mode configured to lock an operating speed of the engine in a manually selected speed, and the manual control mode is configured to control the hydraulic output in proportion to the percentage of the trigger activation.

18. A method, comprising:
  receiving a first request to operate a hydraulic system in a fine control mode, wherein the hydraulic system comprises an engine, a hydraulic pump driven by the engine, and a hydraulic load driven by a hydraulic output supplied by the hydraulic pump;
  locking the engine in a low speed in the fine control mode, wherein the engine comprises an operating speed ranging from the low speed to a high speed;
  restricting the hydraulic output to a range below a limit in the fine control mode; and
  controlling the hydraulic output in proportion to a percentage of a trigger activation using a hydraulic valve configured to vary the hydraulic output by providing a continuously variable hydraulic flow rate in the fine control mode.

19. The method of claim 18, comprising:
  receiving a second request to operate the hydraulic system in an auto control mode;
  varying the operating speed of the engine between the low and high speeds in proportion to the percentage of the trigger activation in the auto control mode; and
  controlling the hydraulic output in proportion to the percentage of the trigger activation in the auto control mode.

20. The method of claim 18, comprising:
  receiving a second request to operate the hydraulic system in a manual control mode;
  locking the operating speed of the engine in a manually selected speed; and
  controlling the hydraulic output in proportion to the percentage of the trigger activation in the manual control mode.

* * * * *